(12) United States Patent
Lee (10) Patent No.: US 7,229,488 B2
(45) Date of Patent: Jun. 12, 2007

(54) INK COMPOSITION, INK CARTRIDGE INCLUDING THE SAME, AND INKJET IMAGE FORMING APPARATUS INCLUDING THE INK CARTRIDGE

(75) Inventor: Jong-in Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 11/496,580

(22) Filed: Aug. 1, 2006

(65) Prior Publication Data

US 2007/0052784 A1    Mar. 8, 2007

(30) Foreign Application Priority Data

Sep. 6, 2005    (KR) .................... 10-2005-0082630

(51) Int. Cl.
C09D 11/00 (2006.01)
C09D 11/02 (2006.01)
B41J 2/01 (2006.01)

(52) U.S. Cl. ................ 106/31.47; 106/31.77; 106/31.58; 106/31.86; 347/100

(58) Field of Classification Search ............ 106/31.47, 106/31.77, 31.58, 31.86; 347/100
See application file for complete search history.

(56) References Cited

U.S. PATENT DOCUMENTS 4,076,494 A * 2/1978 Schuster et al. ............ 8/471
4,710,230 A * 12/1987 Okoshi et al. ............ 106/413
RE33,853 E * 3/1992 Okoshi et al. ............ 106/413
5,112,404 A * 5/1992 Sommer et al. ............ 106/506
5,173,112 A * 12/1992 Matrick et al. .......... 106/31.43
5,205,861 A * 4/1993 Matrick ...................... 524/101
5,529,616 A 6/1996 Prasad
6,417,249 B1 * 7/2002 Nguyen et al. ............ 523/201
6,646,024 B2 11/2003 Beach et al.
2006/0260505 A1* 11/2006 Ham et al. .................. 106/31.8

FOREIGN PATENT DOCUMENTS

| JP | 55-016037 | 2/1980 |
|----|-----------|--------|
| JP | 60-124670 | 7/1985 |
| JP | 03-086772 | 4/1991 |
| JP | 05-179182 | 7/1993 |
| JP | 2002-249698 | 9/2002 |
| JP | 2003-020424 | 1/2003 |

* cited by examiner

*Primary Examiner*—Helene Klemanski
(74) *Attorney, Agent, or Firm*—Stanzione & Kim, LLP (57) ABSTRACT

An ink composition includes a colorant, a solvent, and an amine alcohol compound represented by formula I

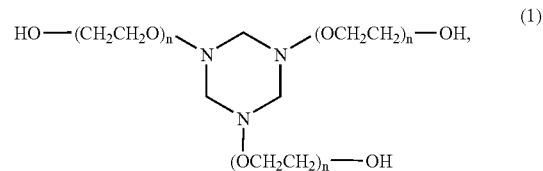

in which n is an integer and $0 \leq n \leq 9$.

14 Claims, 2 Drawing Sheets

INK COMPOSITION, INK CARTRIDGE INCLUDING THE SAME, AND INKJET IMAGE FORMING APPARATUS INCLUDING THE INK CARTRIDGE

CROSS-REFERENCE TO RELATED APPLICATIONS

This application claims priority under 35 U.S.C. §119(a) from Korean Patent Application No. 10-2005-0082630, filed on Sep. 6, 2005, in the Korean Intellectual Property Office, the disclosure of which is incorporated herein in its entirety by reference.

BACKGROUND OF THE INVENTION

1. Field of the Invention

The present general inventive concept relates to an ink composition, an ink cartridge including the same, and an inkjet image forming apparatus, and more particularly, to an ink composition in which a smear characteristic thereof is decreased and a storage stability thereof over a long period of time is enhanced due to an amine alcohol compound having a hexagonal ring, an ink cartridge including the same, and an inkjet image forming apparatus including the ink cartridge.

2. Description of the Related Art

Recently, a dot size of an inkjet printer tends to be small and a printing speed of the inkjet printer tends to be high. Further, a printed image having a high quality and a high resolution is required. In order to obtain a smaller dot size, a head of the inkjet printer must have a smaller nozzle opening. However, such a smaller nozzle opening is easily clogged, and a size of inkjet droplets is influenced by a precipitate. Components of an ink composition used in the inkjet printer are known to influence the nozzle clogging. In order to prevent nozzle clogging, a humectant is usually added to the ink composition.

Further, when an ink composition printed on paper is not dried or absorbed into the paper within a required period of time due to high speed of the printer, a smear phenomenon occurs. In order to improve such a phenomenon, a method of quickly penetrating inks into paper by adding an isopropyl alcohol penetrating agent (U.S. Pat. No. 5,529,616), and a method of using a polymer additive as a binder (U.S. Pat. No. 6,646,024) have been proposed.

However, the penetrating agent is excessively penetrated into paper, thereby decreasing a color density (OD) of a printed image. Furthermore, the polymer additive has poor miscibility in water, thereby causing layer separation or nozzle clogging, and thus decreasing a storage stability of an ink composition including the polymer additive over a long period of time and a durability of an ink cartridge containing the ink composition.

SUMMARY OF THE INVENTION

The present general inventive concept provides an ink composition that has excellent storage stability over a long period of time by enhancing a solubility or dispersity of a colorant of the ink composition, and decreasing a smear characteristic thereof by enabling an easy penetrating of the ink composition into a printing medium, an ink cartridge including the same, and an inkjet image forming apparatus including the ink cartridge.

Additional aspects and advantages of the present general inventive concept will be set forth in part in the description which follows and, in part, will be obvious from the description, or may be learned by practice of the general inventive concept.

The foregoing and/or other aspects and utilities of the present general inventive concept may be achieved by providing an ink composition including a colorant, a solvent, and an amine alcohol compound represented by formula I, in which n is an integer and $0 \leq n \leq 9$.

The foregoing and/or other aspects and utilities of the present general inventive concept may also be achieved by providing an ink cartridge including the ink composition.

The foregoing and/or other aspects and utilities of the present general inventive concept may also be achieved by providing an inkjet image forming apparatus including the ink cartridge.

The foregoing and/or other aspects and utilities of the present general inventive concept may also be achieved by providing an inkjet ink composition, including a colorant, a liquid vehicle, and an amine alcohol compound having a hexagonal ring.

The amine alcohol compound may include at least one —N— group. The amine alcohol compound may include a plurality of —N— groups. The amine alcohol compound may include at least one —OH group. The amine alcohol compound may include a plurality of —OH groups. The amine alcohol compound may include a —N— group and a —OH group, the colorant may include an anionic group, and a hydrogen bond may be formed between at least one of the —N— group and the —OH group of the amine alcohol compound and the anionic group of the colorant. The anionic group may be selected from the group consisting of a —COO⁻ group and a —SO₃⁻ group. The amine alcohol compound may include a —N— group, the colorant may include a hydrogen ion, and a hydrogen bond may be formed between the —N— group of the amine alcohol compound and the hydrogen ion of the colorant.

The amine alcohol compound may be selected from the group consisting of:

-continued

The liquid vehicle may include water and at least one organic solvent. An amount of the at least one organic solvent in the inkjet ink composition may be about 2 to about 60 parts by weight based on 100 parts by weight of the liquid vehicle. The inkjet ink composition may further include at least one surfactant. An amount of the at least one surfactant in the inkjet ink composition may be about 1 to about 50 parts by weight based on 100 parts by weight of the colorant. The inkjet ink composition may further include at least one member selected from the group consisting of a dispersant, a viscosity controller, and a metal oxide. An amount of the dispersant in the inkjet ink composition may be about 1 to about 50 parts by weight based on 100 parts by weight of the colorant. An amount of the viscosity controller in the inkjet ink composition may be about 1 to about 200 parts by weight based on 100 parts by weight of the colorant.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

An ink composition according to embodiments of the present general inventive concept includes a colorant, a solvent, and an amine alcohol compound having a hexagonal ring represented by formula I below.

I

In the formula I, n is an integer and $0 \leq n \leq 9$. For example, n may be an integer in a range of 0 to 4.

When the amine alcohol compound is used as an additive in an ink composition including a colorant, a solubility and/or dispersity of the colorant is enhanced, thereby enhancing a storage stability of the ink composition over a long period of time in the absence of a polymer additive or a penetrating agent. Thus, a smear characteristic of the ink composition (i.e., a characteristic of the ink composition that results in a smearing of an image printed using the ink composition) is decreased because the ink composition more easily penetrates into a printing medium (e.g., paper) due to an increase in an interaction between the printing medium (e.g., the paper) and the ink composition.

The amine alcohol represented by the formula I has a hexagonal ring, and thus has the same skeletal structure as a hexose ring compound of cellulose (formula II), which is a main component of a paper. A hydrogen bond can easily form between a —N— group or a —OH group contained in the amine alcohol and a —OH group or a —H group of cellulose. Thus, when an ink composition that includes the amine alcohol is printed on a printing medium (e.g., paper), the ink composition quickly penetrates into the printing medium (e.g., the paper), thereby shortening a drying time and decreasing a smear characteristic (i.e., a characteristic that results in a smearing of an image printed using the ink composition) of the ink composition. In addition, a hydrogen bond can form between an anionic group (such as a —COO$^-$ group or a —SO$_3^-$ group) present on a surface of a colorant included in the ink composition and a —N— group or a —OH group of the amine alcohol, which increases a fusing property of the colorant on the printing medium (i.e., the paper). As a result, a rubbing resistance and a bleeding resistance are enhanced due to the colorant's quick penetration into the printing medium (i.e., the paper).

Cellulose

II

Further, a hydrogen ion (H+) on the surface of the colorant can associate with a —N— group of the amine alcohol so that the colorant is in an anionic state, thereby increasing a solubility of the colorant in water, and thus a desired storage stability of the colorant over a long period of time can be obtained.

The ink composition including the amine alcohol compound can be used in a variety of applications and industries, such as an inkjet ink, a printing ink, a paint, a textile printing compound, the paper industry, the cosmetics industry, and the ceramic industry.

An amount of the amine alcohol represented by the formula I in the ink composition may be in a range of about 1 to about 500 parts by weight based on 100 parts by weight of the colorant. If the amount of the amine alcohol is less than about 1 part by weight, a performance of the amine alcohol may be only very slightly achieved. On the other hand, if the amount of the amine alcohol exceeds about 500 parts by weight, a solubility of the amine alcohol may be decreased.

The colorant may be at least one of a dye and a pigment. The pigment may be a self-dispersible pigment that does not require a separate dispersant, or a pigment that requires a separate dispersant.

The solvent may be an aqueous liquid medium or a mixture of the aqueous liquid medium and an organic solvent.

The ink composition may have a surface tension of 20 to 65 dyne/cm at 20° C. If the surface tension of the ink composition at 20° C. is less than dyne/cm, a color density thereof is decreased, and thus it is difficult to realize a desired color since the ink composition penetrates into the printing medium (e.g., paper) too quickly. If the surface tension of the ink composition at 20° C. exceeds 65 dyne/cm, a smear trouble occurs due to a slow penetration of the ink composition into the printing medium (e.g., the paper).

The ink composition may have a viscosity of 1.0 to 10 cps at 20° C. If the viscosity of the ink composition at 20° C. is less than 1.0 cps, the ink composition is too dilute and ink droplets of the ink composition are not jetted (e.g., by a bubbling of the ink composition) due to the low concentration of the ink composition. Even though ink droplets are jetted, a dot size of the ink is too small and the penetration of the ink composition into the printing medium (e.g., the paper) is too severe to obtain a desired image concentration. On the other hand, if the viscosity of the ink composition at 20° C. exceeds 10 cps, a fluidity of the ink composition may be negatively affected.

The solvent may be an aqueous liquid medium. For example, water may be used alone as the solvent. Alternatively, water may be used in a mixture with at least one organic solvent. A total amount of the solvent in the ink composition may be about 1,000 to about 9,900 parts by weight based on 100 parts by weight of the colorant. If the amount of the solvent is less than about 1,000 parts by weight, the storage stability of the ink composition over a long period of time may be decreased, resulting in nozzle clogging. On the other hand, if the amount of the solvent exceeds about 9,900 parts by weight, a color density of the ink composition is too low to realize a desired color.

A total amount of the at least one organic solvent may be in a range of about 2 to about 60 parts by weight based on 100 parts by weight of the solvent (which includes water and the at least one organic solvent). When water and the at least one organic solvent are used together, a viscosity and a surface tension of the ink composition can be controlled to be in a desired range.

The organic solvent may be, but is not limited to, an alcohol compound (such as methyl alcohol, ethyl alcohol, n-propyl alcohol, isopropyl alcohol, n-butyl alcohol, sec-butyl alcohol, t-butyl alcohol, or isobutyl alcohol), a ketone compound (such as acetone, methylethyl ketone, or diacetone alcohol), an ester compound (such as ethyl acetate or ethyl lactate), a polyhydric alcohol compound (such as ethylene glycol, diethylene glycol, triethylene glycol, propylene glycol, dipropylene glycol, butylene glycol, 1,3-butanediol, 1,4-butanediol, 1,2,4-butanetriol, 1,5-pentanediol, 1,2-hexanediol, 1,2,6-hexanetriol, hexylene glycol, glycerol, glycerol ethoxylate, or trimethylol propane ethoxylate), a lower alkyl ether compound (such as ethylene glycol monomethyl ether, ethylene glycol monoethyl ether, diethylene glycol methyl ether, diethylene glycol ethyl ether, triethylene glycol monomethyl ether, or triethylene glycol monoethyl ether), a nitrogen-containing compound (such as 2-pyrrolidone or N-metyl-2-pyrrolidone), or a sulfur-containing compound (such as a sulfur-containing compound selected from the group consisting of dimethyl sulfoxide, tetramethylene sulfone, and thioglycol).

The ink composition can further include a surfactant, if desired. The surfactant controls a surface tension of the ink composition when included therein, thereby stabilizing a jetting performance of the ink composition at a nozzle. An amount of the surfactant in the ink composition may be in a range of about 1 to about 50 parts by weight based on 100 parts by weight of the colorant. If the amount of the surfactant is less than 1 part by weight, the effect of the surfactant is insignificant. If the amount of the surfactant exceeds about 50 parts by weight, a portion of the ink composition on a surface of a nozzle is quickly dried and a viscosity of the ink composition is increased, resulting in a clogging of the nozzle. Specific examples of the surfactant include, but are not limited to, acetylenic glycol (manufactured by Air Product), Tergitol (manufactured by Union Carbide), Saccharide polyethylene oxide (manufactured by ICI), and Disperbyk (manufactured by BYK).

The ink composition according to embodiments of the present general inventive concept may further include an additive, such as a dispersant, a viscosity controller, and/or a metal oxide.

Specific examples of the dispersant include, but are not limited to, styrene methylacrylate-acrylic acid copolymer, butylmethacrylate-methacrylic acid copolymer, SMA (styrene maleic anhydride), an acrylic dispersant (Johncryl 61, 62), and a sodium salt of naphthalene sulfonic acid-formalin condensate (Demol N, manufactured by Kao Co.). An amount of the dispersant in the ink composition may be in a range of about 1 to about 200 parts by weight based on 100 parts by weight of the colorant. For example, the amount of the dispersant may be in a range of about 1 to about 50 parts by weight based on 100 parts by weight of the colorant. If the amount of the dispersant is less than about 1 part by weight, an effect of the dispersant is insignificant. On the other hand, if the amount of the surfactant exceeds about 50 parts by weight, a portion of the ink composition on a surface of a nozzle is quickly dried, and the viscosity of the ink composition is increased, resulting in a clogging of the nozzle.

The viscosity controller controls the viscosity of the ink composition to maintain smooth jetting thereof. The viscosity controller may be, but is not limited to, at least one member selected from the group consisting of polyvinyl alcohol, casein, polyvinyl pyrrolidone, polyethylene glycol, polypropylene glycol, polyethylene propylene copolymer, and carboxymethyl cellulose. An amount of the viscosity controller may be in a range of about 1 to about 200 parts by weight based on 100 parts by weight of the colorant. If the amount of the viscosity controller is less than about 1 part by weight, an effect of the viscosity controller is insignificant. On the other hand, if the amount of the viscosity controller exceeds about 200 parts by weight, the viscosity of the ink composition is undesirably increased.

The ink composition may further include an acid or a base. The acid or base increases a solubility of a humectant against the solvent, and stabilizes the colorant. An amount of the acid or base may be in a range of about 1 to about 50 parts by weight based on 100 parts by weight of the colorant. If the amount of the acid or base is less than about 1 part by weight, it is difficult to obtain a desired pH. On the other hand, if the amount of the acid or base exceeds about 50 parts by weight, a stability of the colorant may be decreased.

The ink composition according to embodiments of the present general inventive concept may be prepared as follows.

The colorant, the amine alcohol compound of the formula I, and other desired components are mixed in the solvent and then stirred sufficiently to be in a homogeneous state. Then, the resulting product is passed through a filter to obtain the ink composition.

The ink composition according to embodiments of the present general inventive concept can be used, for example, in a toner composition, various paints and a coating liquid. However, the ink composition is not so limited, and thus can be used in a variety of other applications. For example, the ink composition may also be used in an inkjet printer cartridge including an array head. The throughput of an inkjet printer including an array head can be increased since the inkjet printer including the array head prints with high speed by employing many chips (unlike a shuttle-type inkjet printer that prints an image by employing only one chip).

Figure 1:
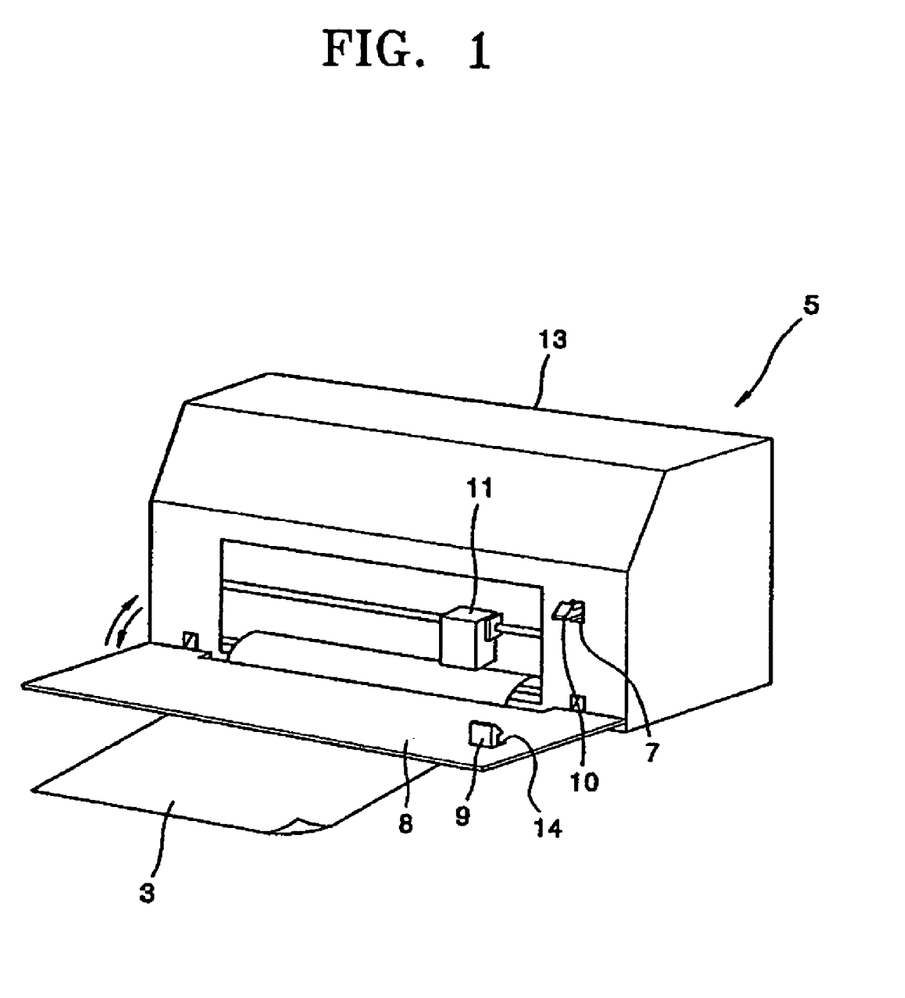
FIG. 1 is a perspective view illustrating an inkjet image forming apparatus, according to an embodiment of the present general inventive concept.

FIG. 1 is a perspective view illustrating an inkjet image forming apparatus 5, according to an embodiment of the present general inventive concept. Referring to FIG. 1, the inkjet image forming apparatus 5 includes an ink cartridge 11 including an ink composition. The ink composition may include a compound of the formula I, a colorant, a water-soluble solvent and water. A printer cover 8 is connected through a hinge with a main body 13 of the inkjet image forming apparatus 5. A region of a moving latch 10 protrudes through a hole 7. The moving latch 10 is engaged with a fixed latch 9, and the fixed latch 9 is connected to the inside of the printer cover 8 when the printer cover 8 is closed. The printer cover 8 has a recess 14 corresponding to the region of the moving latch 10 protruding through the hole 7. The ink cartridge 11 is mounted in the main body 13 and ink is ejected on a printing medium, such as a piece of paper 3, passing through the lower part of the ink cartridge 11.

Figure 2:
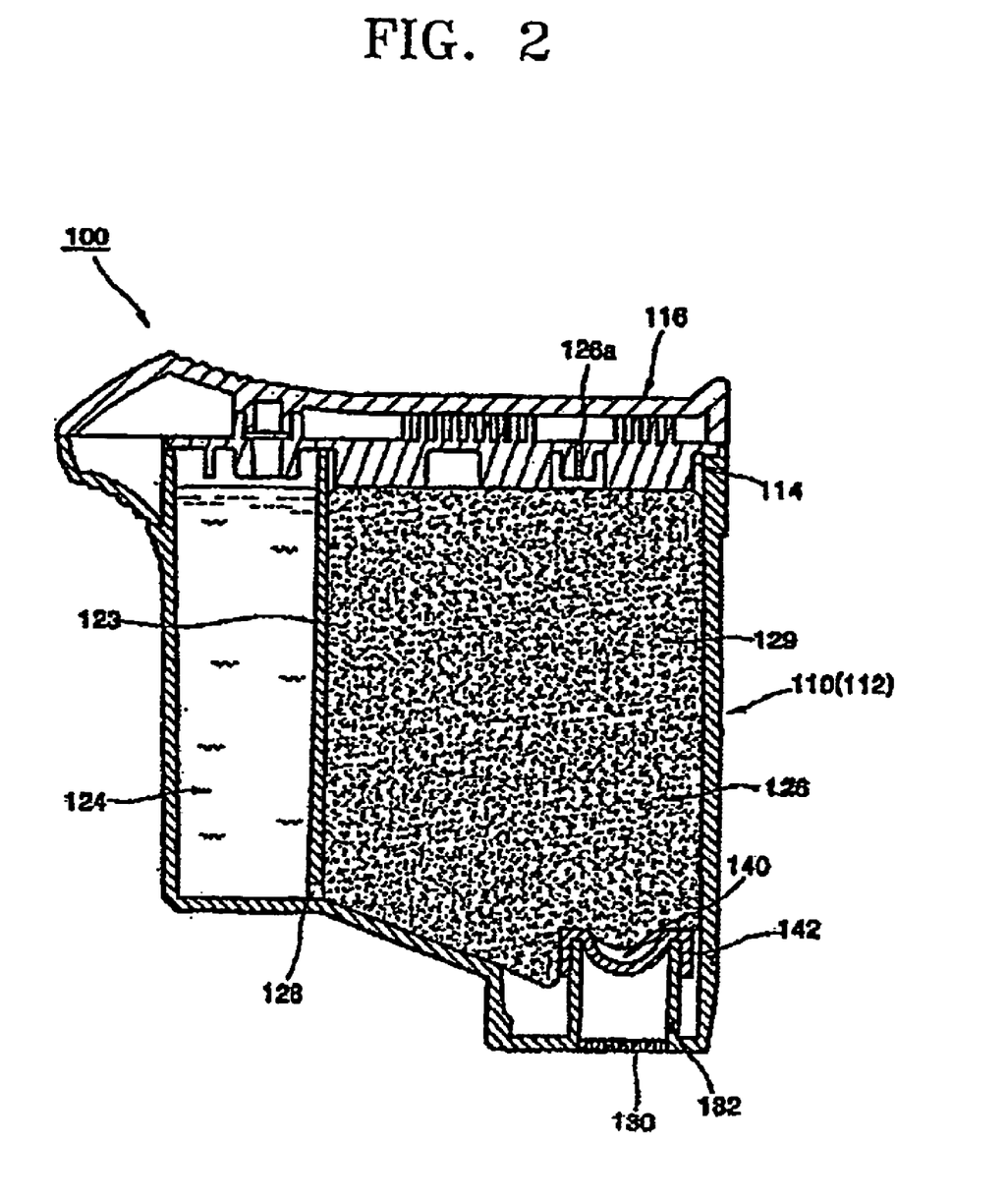
FIG. 2 is a sectional view illustrating an ink cartridge, according to an embodiment of the present general inventive concept.

FIG. 2 is a sectional view illustrating an ink cartridge 100, according to an embodiment of the present general inventive concept. The ink cartridge 100 may include an inkjet ink composition including a compound of the formula I, a colorant, a water-soluble solvent and water according. The ink cartridge 100 includes a main body 110 forming an ink receiver 112, an inner cover 114 covering a top region of the ink receiver 112, and an outer cover 116 spaced apart from the inner cover 114 at a predetermined interval and sealing the ink receiver 112 and the inner cover 114.

The ink receiver 112 is divided into a first chamber 124 and a second chamber 126 by a vertical barrier wall 123. An ink passage 128 is formed in a lower part of the vertical barrier wall 123 between the first chamber 124 and the second chamber 126. Ink is filled into the first chamber 124 and a sponge 129, and then the second chamber 126. Avent hole 126a corresponding to the second chamber 126 is formed in the inner cover 114.

A filter 140 to prevent a nozzle 130 of a printer head from clogging is formed in a lower part of the second chamber 126 to filter impurities and minute bubbles from the ink. A hook 142 is formed in an edge region of the filter 140 and coupled to the top region of a standpipe 132. Ink in the ink receiver 120 passes through the nozzle 130 of the printer head and is ejected as small droplets on the printing medium.

The present general inventive concept will be described in greater detail with reference to the following examples. The following examples are for illustrative purposes only and are not intended to limit the scope of the general inventive concept.

EXAMPLES

Ink compositions of Examples 1–17 and Comparative Examples 1–6 were prepared using colorants and surfactants, and the ink compositions of Examples 1–17 also included amine alcohol compounds.

Dyes used as colorants are as follows:

Dyes:
Dye-C 1: Basacid Blue 762, manufactured by BASF.
Dye-C 2: IJ Blue 319H, manufactured by Daiwa.
Dye-M 1: SM-1, manufactured by Nippon.
Dye-M 2: Red AJ, manufactured by Chugai.
Dye-Y 1: Yellow GGN, manufactured by Spectra.
Dye-Y 2: Water Yellow 6, manufactured by Orient Chemical.
Dye-Bk 1: Schwarz SP, manufactured by Bayer.
Dye-Bk 2: Direc Bk HEF, manufactured by Clariant.

Self-dispersible pigments used as colorants are as follows:

Self-dispersible Pigments:
S-Pigment 1: Cabot 200, manufactured by Cabot (Bk).
S-Pigment 2: IJX-253, manufactured by Cabot (Cyan).
S-Pigment 3: IJX-266, manufactured by Cabot (Magenta).
S-Pigment 4: IJX-444, manufactured by Cabot (Yellow).

Pigments used as colorants are as follows:

Pigments:
Pigment 1: Raven 5250, manufactured by Columbian.
Pigment 2: Furnace Black 101, manufactured by Degussa.
Pigment 3: Heliogen blue D 7080, manufactured by BASF (Cyan).
Pigment 4: Quindo magenta RV-6832, manufactured by Bayer (Magenta).
Pigment 5: Sicopal Yellow L 1100, manufactured by BASF (Yellow).

The pigments were used as Dispersions 1–5, prepared as follows.

After 2.0 g of styrene methylacrylate-acrylic acid copolymer was dissolved as a dispersant in water, 4.0 g of Pigment-1 were added and premixed at 500 rpm for 1 hour. Then, after stirring with a Dipermat disperser (having a bead size of 0.3 mm) at 10,000 rpm, the resulting product was filtered through a glass filter having a pore size of 2 μm to obtain Dispersion 1.

After 2.0 g of styrene methylacrylate-acrylic acid copolymer was dissolved in water, Dispersion 2 was prepared in the same manner as for Dispersion 1, except that 2.5 g of butyl methacrylate-acrylic acid copolymer and 5 g of Pigment-2 were used instead of 4.0 g of Pigment-1.

After 2.0 g of styrene methylacrylate-acrylic acid copolymer was dissolved in water, Dispersion 3 was prepared in the same manner as for Dispersion 1, except that 50 g of ethyl hexyl methacrylate-methacrylic acid copolymer and 7.0 g of Pigment-3 were used instead of 4.0 g of Pigment-1.

After 2.0 g of styrene methylacrylate-acrylic acid copolymer was dissolved in water, Dispersion 4 was prepared in the same manner as for Dispersion 1, except that 5.5 g of styrenic maleic acid anhydride (SMA) and 8.2 g of Pigment-4 were used instead of 4.0 g of Pigment-1.

After 2.0 g of styrene methylacrylate-acrylic acid copolymer was dissolved in water, Dispersion 5 was prepared in the same manner as for Dispersion 1, except that 2 g of Johncryl-61 and 4 g of Pigment-5 were used instead of 4.0 g of Pigment-1.

The surfactants used are as follows:

Surfactants:
Surfactant 1: Disperbyk-181 manufactured by BYK.
Surfactant 2: Disperbyk-183 manufactured by BYK.

Surfactant 3: Surfynol 465 manufactured by Air Product.
Surfactant 4: Surfynol 104 manufactured by Air Product.
Surfactant 5: Polyoxyethylene(20) sorbitan monostearate manufactured by ICI.

The amine alcohol compounds used are as follows:

Amine Alcohol Compounds:

Amine alcohol compound 1

Amine alcohol compound 2

Amine alcohol compound 3

Amine alcohol compound 4

Amine alcohol compound 5

The ink compositions of Examples 1–17 and Comparative Examples 1–6 were prepared in the following manner.

After respective ink composition components were added to a 250 mL beaker according to Table 1, water was added to obtain a total mixture amount of 100 g. Then, after stirring with a stirrer at 700 rpm for 30 minutes to a homogeneous state, the resulting product was filtered through a 0.45 μm filter paper to obtain a final ink composition. In Table 1, numbers in parentheses indicate amounts in parts by weight. The amount of the colorant is based on 100 parts by weight of the respective ink composition. The amounts of the surfactants, the amine alcohol, and the organic solvent are each based on 100 parts by weight of the colorant.

TABLE 1

| Sample | Colorant (pbw) | Surfactant A (pbw) | Surfactant B (pbw) | Amine alcohol (pbw) | Organic solvent (pbw) |
|---|---|---|---|---|---|
| Example 1 | Dye-C1, (4) | X | X | Amine alcohol 1 (4) | 1,4-butanediol (12) |
| Example 2 | Dye-C2, (4) | Surfactant 3 (0.2) | x | Amine alcohol 3 (10) | 1,2-hexanediol (6) |
| Example 3 | Dye-M1 (4) | X | x | Amine alcohol 4 (6) | 1,3-butanediol (14) |
| Example 4 | Dye-M2 (4) | Surfactant 5 (0.1) | Surfactant 1 (0.1) | Amine alcohol 2 (15) | 1,4-butanediol (6) |
| Example 5 | Dye-Y1 (4) | x | X | Amine alcohol 5 (8) | 1,2-hexanediol (10) |
| Example 6 | Dye-Y2 (4) | Surfactant 2 (0.2) | X | Amine alcohol 3 (18) | Hexylene glycol (7) |
| Example 7 | Dye-Bk1 (4) | X | X | Amine alcohol 1 (9) | 1,2,6-hexenetriol (14) |
| Example 8 | Dye-Bk2 (4) | x | Surfactant 4 (0.2) | Amine alcohol 2 (15) | Dipropylene glycol (13) |
| Example 9 | S-Pigment 1 (4) | X | x | Amine alcohol 4 (8) | Triethylene glycol (11) |
| Example 10 | S-Pigment 2 (4) | Surfactant 5 (0.1) | x | Amine alcohol 5 (7) | 1,3-butanediol (13) |
| Example 11 | S-Pigment 3 (4) | x | x | Amine alcohol 2 (5) | Triethylene glycol (17) |
| Example 12 | S-Pigment 4 (4) | x | Surfactant 3 (0.1) | Amine alcohol 1 (8) | 1,3-butanediol (10) |
| Example 13 | Dispersion 1 (20) | x | x | Amine alcohol 4 (3) | 1,2-hexanediol (11) |
| Example 14 | Dispersion 2 (16) | x | Surfactant 1 (0.3) | Amine alcohol 5 (3) | 1,4-butanediol (6) |
| Example 15 | Dispersion 3 (12) | x | X | Amine alcohol 3 (4) | 1,3-butanediol (11) |

TABLE 1-continued

| Sample | Colorant (pbw) | Surfactant A (pbw) | Surfactant B (pbw) | Amine alcohol (pbw) | Organic solvent (pbw) |
|---|---|---|---|---|---|
| Example 16 | Dispersion 4 (10) | Surfactant 2 (0.1) | Surfactant 1 (0.2) | Amine alcohol 1 (7) | 1,2-hexanediol (16) |
| Example 17 | Dispersion 5 (20) | Surfactant 4 (0.2) | Surfactant 5 (0.2) | Amine alcohol 2 (6) | 1,2,6-hexanetriol (18) |
| Comp. Example 1 | Dye-C1 (4) | Surfactant 3 (3.0) | X | x | Dipropylene glycol (10) |
| Comp. Example 2 | Dye-Bk1 (4) | Surfactant 2 (2.0) | Surfactant 4 (2.0) | x | 1,4-butanediol (13) |
| Comp. Example 3 | Dispersion 1 (20) | Surfactant 1 (2.5) | Surfactant 5 (2.5) | x | 1,2-hexanediol (12) |
| Comp. Example 4 | Dispersion 2 (16) | Surfactant 4 (2) | Surfactant 3 (4) | x | 1,3-butanediol (15) |
| Comp. Example 5 | Dispersion 3 (12) | Surfactant 5 (3) | Surfactant 2 (4) | x | 1,4-butanediol (11) |
| Comp. Example 6 | Dispersion 4 (10) | Surfactant 3 (4) | Surfactant 2 (5) | x | 1,2,6-hexanetriol (10) |

Experimental Example 1

Test for Nozzle Clogging

The ink compositions obtained in Examples 1–17 and Comparative Examples 1–6 were filled in a Samsung ink cartridge at ambient temperature (25° C.) and low temperature (−5° C.). Printing was performed using the ink cartridges after 2 weeks to determine how many nozzles of the ink cartridges were clogged. The results are described in Table 2 below, based on the following criteria:

⊚: nozzle clogging below about 5% of nozzles was observed.

O: nozzle clogging at about 6 to about 10% of nozzles was observed.

X: nozzle clogging at about 11 to 20% of nozzles was observed.

XX: nozzle clogging at more than about 21% of nozzles was observed.

Experimental Example 2

Test for Rubbing Resistance

The ink compositions obtained in Examples 1–17 and Comparative Examples 1–6 were refilled in an ink cartridge M-50 (manufactured by Samsung Electronics Co., Ltd.). Then, immediately after a bar picture (2*10 cm) was printed on a sheet of paper using a printer (MJC-2400C, manufactured by Samsung Electronics Co., Ltd.), the sheet of paper was dried for 24 hours and was rubbed 5 times using a tester. Then, the OD (optical density) value of the image that was transferred from the bar picture due to the rubbing was compared to the OD value of the image of the bar picture on the sheet of paper before the rubbing. The results in percentage are described in Table 2 below, based on the following criteria, where A=(OD of transferred image/OD of original bar picture)×100:

⊚: A<10.

O: $10 \leq A < 20$.

X: $20 \leq A \leq 30$.

XX: A>30.

Experimental Example 3

Test for Bleeding Resistance

The ink compositions obtained in Examples 1–17 and Comparative Examples 1–6 were refilled in an ink cartridge M-50 (manufactured by Samsung Electronics Co., Ltd.). Then, a test pattern was printed using a printer (MJC-2400C, manufactured by Samsung Electronics Co., Ltd.) with C-60 (manufactured by Samsung Electronics Co., Ltd.) color ink, and after 30 minutes, the position of a dot line at which color mixing occurred based on the border line between two adjacent colors was determined with a microscope, based on the following criteria using the evaluation standard set forth in U.S. Pat. No. 5,854,307, where 1 dot diameter=100 μm based on 600 dpi:

5: Color mixing did not appear near the throughout borderline.

4: Color mixing appeared at a width corresponding to 1 dot diameter.

3: Color mixing appeared at a width corresponding to 2 dot diameter.

2: Color mixing appeared at a width corresponding to 3 dot diameter.

1: Color mixing appeared at a width corresponding to 4 or more dot diameter.

Experimental Example 4

Evaluation Experiment for Smear Characteristics

The ink compositions obtained in Examples 1–17 and Comparative Examples 1–6 were refilled in an ink cartridge M-50 (manufactured by Samsung Electronics Co., Ltd.). Then, immediately after a bar picture (3*20 cm) was printed on a sheet of paper using a printer (MJC-2400C, manufactured by Samsung Electronics Co., Ltd.), the bar picture was dried and the OD value (OD1) of the bar picture was measured. Then, immediately thereafter, a second bar picture (3*20 cm) was printed on another sheet of paper, and 50 general sheets of paper were sequentially-placed on the printed face of the second sheet of paper for 10 seconds each. The OD value (OD2) of the second bar picture after the sequential-placing of the 50 general sheets of paper was measured and compared with the OD value (OD1) of the original bar picture. The results in percentage are described in Table 2 below, based on the following criteria, where D=Smear characteristics=(OD2/OD1)×100:
◎: 70<D.
O: 50≦D≦70.
X: 30≦D≦50.
XX: D<30.

Experimental Example 5

Evaluation Experiment for Storage Stability

The ink compositions obtained in Examples 1–17 and Comparative Examples 1–6 were filled in an ink cartridge M-50 (manufactured by Samsung Electronics Co., Ltd.) at ambient temperature (25° C.), low temperature (−18° C.), and high temperature (38° C.), and printing using a printer (MJC-2400C, manufactured by Samsung Electronics Co., Ltd.) was performed after 2 weeks to determine how many nozzles were clogged. The results are described in Table 2 below, based on the following criteria, where E=Storage stability=(total nozzles−clogged nozzles)/total nozzles×100:
◎: 90<E.
○: 70≦E≦90.
X: 50≦E<70.
XX: E<50.

TABLE 2

|  | Test for nozzle clogging | Test for rubbing resistance | Test for bleeding resistance | Smear characteristics | Storage stability |
| --- | --- | --- | --- | --- | --- |
| Example 1 | ◎ | ◎ | ◎ | ○ | ◎ |
| Example 2 | ○ | ◎ | ○ | ◎ | ◎ |
| Example 3 | ◎ | ○ | ◎ | ○ | ◎ |
| Example 4 | ○ | ◎ | ◎ | ◎ | ○ |
| Example 5 | ○ | ○ | ◎ | ○ | ◎ |
| Example 6 | ◎ | ○ | ○ | ◎ | ◎ |
| Example 7 | ○ | ◎ | ◎ | ○ | ◎ |
| Example 8 | ◎ | ◎ | ○ | ◎ | ◎ |
| Example 9 | ○ | ○ | ○ | ◎ | ◎ |
| Example 10 | ◎ | ○ | ◎ | ◎ | ◎ |
| Example 11 | ◎ | ○ | ○ | ◎ | ○ |
| Example 12 | ○ | ◎ | ○ | ◎ | ◎ |
| Example 13 | ○ | ○ | ○ | ◎ | ◎ |
| Example 14 | ◎ | ◎ | ◎ | ○ | ○ |
| Example 15 | ○ | ○ | ○ | ◎ | ○ |
| Example 16 | ◎ | ◎ | ○ | ◎ | ○ |
| Example 17 | ◎ | ○ | ◎ | ○ | ◎ |
| Comp. Example 1 | X | X | X | ○ | X |
| Comp. Example 2 | ◎ | ○ | ○ | X | ○ |
| Comp. Example 3 | XX | ○ | ○ | X | XX |
| Comp. Example 4 | ○ | XX | XX | ○ | ○ |
| Comp. Example 5 | X | X | ○ | X | XX |
| Comp. Example 6 | ○ | XX | XX | ○ | X |

As demonstrated by the results described in Table 2, the ink compositions of Examples 1–17 according to embodiments of the present general inventive concept decrease a smearing of an image printed using the ink compositions, as compared to Comparative Examples 1–6, since the ink compositions quickly penetrate into a paper after printing due to a strong interaction of an amine alcohol compound with the paper. Further, a storage stability over a long period of time is enhanced in the ink composition of Examples 1–17, as compared to Comparative Examples 1–6, since a solubility of a colorant against water is elevated.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. An ink composition, comprising:
a colorant;
a solvent; and
an amine alcohol compound represented by formula I wherein n is an integer and $0 \leq n \leq 9$.

2. The ink composition of claim 1, wherein n 0, 1, 2, 3 or 4.

3. The ink composition of claim 1, wherein an amount of the amine alcohol compound is in a range of about 1 to about 500 parts by weight based on 100 parts by weight of the colorant.

4. The ink composition of claim 1, wherein the colorant is at least one of a dye and a pigment.

5. The ink composition of claim 1, wherein the solvent is an aqueous liquid medium or a mixture of the aqueous liquid medium and an organic solvent.

6. The ink composition of claim 1, wherein an amount of the solvent is in a range of about 1,000 to about 9,900 parts by weight based on 100 parts by weight of the colorant.

7. The ink composition of claim 5, wherein the organic solvent is at least one compound selected from the group consisting of methyl alcohol, ethyl alcohol, n-propyl alcohol, isopropyl alcohol, n-butyl alcohol, sec-butyl alcohol, t-butyl alcohol, isobutyl alcohol, acetone, methylethyl ketone, diacetone alcohol, ethyl acetate, ethyl lactate, ethylene glycol, diethylene glycol, triethylene glycol, propylene glycol, butylene glycol, 1,4-butanediol, 1,2,4-butanetriol, 1,5-pentanediol, 1,2,6-hexanetriol, hexylene glycol, glycerol, glycerol ethoxylate, trimethylol propane ethoxylate, ethylene glycol monomethyl ether, ethylene glycol monoethyl ether, diethylene glycol methyl ether, diethylene glycol ethyl ether, triethylene glycol monomethyl ether, triethylene glycol monoethyl ether, dimethyl sulfoxide, tetramethylene sulfone, and thioglycol.

8. The ink composition of claim 1, wherein the ink composition has a surface tension at 20° C. in a range of about 20 to about 65 dyne/cm, and a viscosity at 20° C. in a range of about 1.0 to about 10 cps.

9. The ink composition of claim 8, wherein an optical density of the ink composition after a post-printing smear test exceeds 50% of an optical density of the ink composition after printing but before the post-printing smear test.

10. An ink cartridge including an ink composition, comprising:
a colorant;
a solvent; and an amine alcohol compound represented by formula I wherein n is an integer and $0 \leq n \leq 9$.

11. An inkjet image forming apparatus including an ink cartridge comprising an ink composition, the ink composition comprising:
   a colorant;
   a solvent; and
   an amine alcohol compound represented by formula I wherein n is an integer and $0 \leq n \leq 9$.

12. The ink composition of claim 1, wherein the amine alcohol compound is selected from the group consisting of:

13. The ink composition of claim 1, further comprising:
   at least one surfactant.

14. The ink composition of claim 13, wherein an amount of the at least one surfactant in the ink composition is about 1 to about 50 parts by weight based on 100 parts by weight of the colorant.

* * * * *